Oct. 13, 1925.

A. J. KLONECK 1,556,612

VARIABLE INDUCTANCE AND COUPLER

Filed Dec. 15, 1921

WITNESS.

INVENTOR.

August J. Kloneck.

Patented Oct. 13, 1925.

1,556,612

UNITED STATES PATENT OFFICE.

AUGUST J. KLONECK, OF NEW YORK, N. Y.

VARIABLE INDUCTANCE AND COUPLER.

Application filed December 15, 1921. Serial No. 522,597.

*To all whom it may concern:*

Be it known that I, AUGUST J. KLONECK, a citizen of the United States, residing at New York city, in the county of New York and State of New York, have invented certain new and useful Improvements in Variable Inductances and Couplers, of which the following is a specification.

This invention relates to variable inductances such as chiefly used for tuning alternating or high frequency currents for radio telephoning, telegraphing, for measurements, and for other purposes.

One object of the invention is to produce a variable inductance by moving two or more coils with respect to one another so as to have the coils mutually magnetic or opposing one another.

Another object of the invention is to combine sets of such inductances to form cooperating coils such as the primary and the secondary of a transformer.

These and other allied objects are attained by the novel arrangement and combination of parts hereinafter fully described and shown in the accompanying drawings and in which:—

Figure 1:
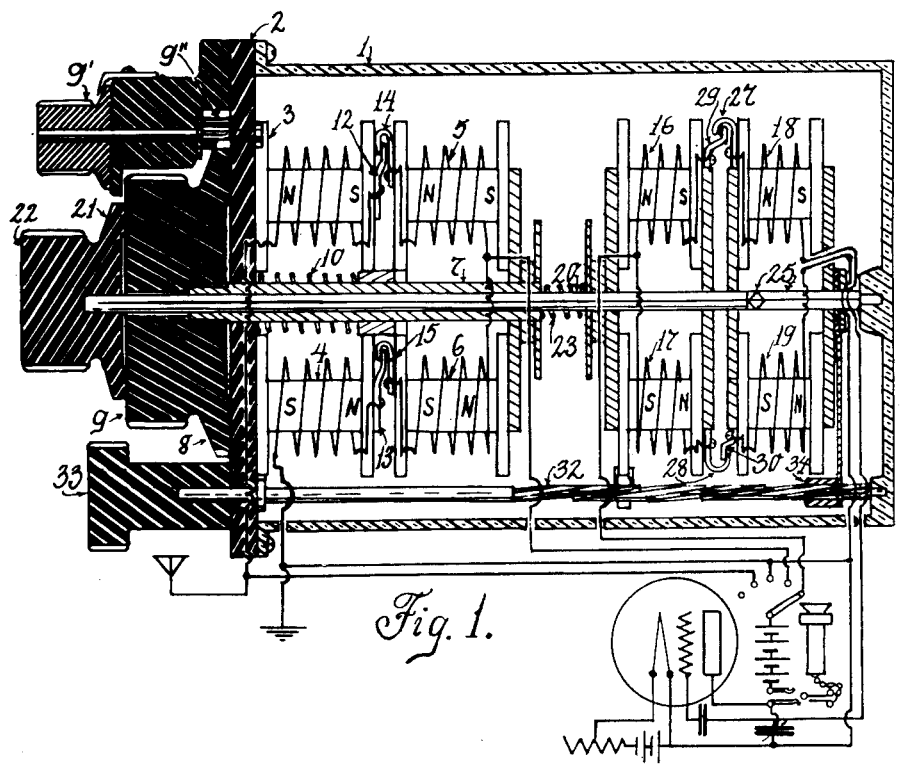
Figure 2:
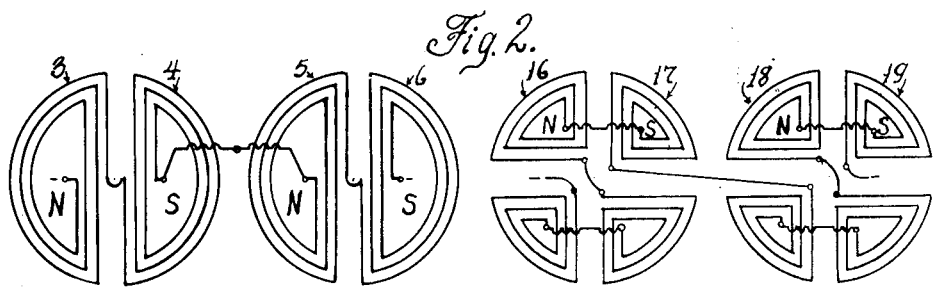

Figure 1 shows a cross sectional view of the inductance. Figure 2 shows a diagrammatic view of a transformer combining several coil sets.

Referring more particularly to the drawings wherein similar characters denote corresponding parts, 1 is a receptacle having a cover 2 thereon. Attached upon the inner side of cover 2 are two semicircular coils 3 and 4 forming a stationary part of one set of inductance coils. Said coils 3 and 4 being connected together to form opposing poles at one side of the set. Coacting with said stationary coils are two rotatable coils 5 and 6. The latter are arranged upon a tubular shaft 7 which leads between coils 3 and 4 and a center hole in the cover plate 2 to a brake and dial 8 and an adjusting knob 9. A spring 10 upon the tubular shaft 7 causes the dial 8 to be moved with friction upon the cover 2. For this purpose the dial 8 and cover 2 are centrally undercut causing engagement of a circumferential band only. A separate knob 9' operates by gear 9'' the dial 8 for finer adjustments. As each of the rotatable coils 5 and 6 have different magnetic poles facing the stationary coils 3 and 4 it will be noted that at one position of the coils such as shown, the stationary and rotatable coils will mutually magnetize one another, while with rotatable coils turned around the same magnetic poles of the stationary and rotatable coils will be opposed to each other causing the inductance of the coil set to be zero as the same forms one circuit with one another. Connection between the rotatable coils and the stationary part is established by two contact brushes 12 and 13 which contact with ring collectors 14 and 15.

Assuming that a separate primary and secondary inductance is needed I arrange another coil set in inductive relation to the described coil set, the latter then forming an independent circuit for a transformer. The second coil set comprises two nonrotating coils 16 and 17 which however are slidably arranged back and forth from the first coil set so as to obtain a loose coupling effect between the two coil sets. Two rotatable coils 18 and 19 arranged on shafting 20 coact with coils 16 and 17 as one coil combination. The rotating shaft 20 of coils 18 and 19 projects through the tubular shaft 7, the dial 8 and knob portion 9 to another indicating disk 21 and adjusting knob 22 arranged to move upon knob 9. A spring 23 upon shaft 20 serves for frictioning disk 21 upon knob 9. The end 25 of shaft 20 is flattened or squared and the hole of the rotating coils 18 and 19 is similarly shaped permitting a sliding movement of the rotating coils 18 and 19 upon shaft 20. Said rotating coils 18 and 19 are connected with the stationary coils by two rings 27 and 28 having overlapping flanges thereupon and contacts 29 and 30 engaging said flanged rings toward coils 16 and 17.

For the sliding movement of the last coil set 16 to 19 I employ a spiral or worm threaded shaft 32 secured to a knob 33 on the cover plate 2 and engaging a spiral threaded arm 34 of the coils 16 to 19.

It will be obvious that I may omit two coils on each set or arrange three, four or six coils around the shafts or add more than two coil sets in one combination, if convenient or desirable. Further I may employ coils of square or circular shape instead of the semicircular shape if desired.

It will be noted that such variable inductances and coupling transformers as here described have a marked advantage to the present types of coils. Since particularly air core coils in radio signaling form small loop aerials and thus produce interaction and interference with other coil actions several hundred feet away therefrom and also with the coils of the same set which can not be shielded therefrom, it is advantageous to employ such parallel, oppositely wound coils as described so that the same will not produce an outside magnetic field or be affected by an outside magnetic field.

Having now fully described my invention what I claim as new and desire to secure by Letters Patent is:—

1. A variable inductance element comprising two groups of coils, respectively stationary and revoluble, the coils of each group being arranged in planetary formation about a common axis and means for electrically interconnecting said groups of coils, said last means comprising contact springs and circular collectors arranged between said groups of coils.

2. A variable inductance element comprising independent coil sets, each coil set including revoluble coil parts and non-revoluble coil parts, means for rotating said revoluble coil parts, means for electrically interconnecting revoluble and non-revoluble coil parts of each set and means for inductively separating said independent coil sets, said last means comprising a spiral shafting, the coils of each part being arranged in planetary formation about the axis of rotation of the revoluble part.

3. A variable inductance and coupler including primary and a secondary coil set, means for varying the inductance relation between said primary and said secondary coil sets by a movement of the coil sets with respect to one another, means for varying the inductive relation between the coils of each set from having turns and magnetic effects opposed to one another to being magnetically cooperating, each of said coil sets having a part of its coils movable in planetary direction with respect to the other part of the coils, and means for moving the movable coils of each set, and one set with respect to the other set.

In testimony whereof, I have signed my name to this specification this 25th day of September, 1919.

AUGUST J. KLONECK.